V. CALHOUN.
HARROW.
APPLICATION FILED MAR. 31, 1915.
1,148,352.
Patented July 27, 1915.
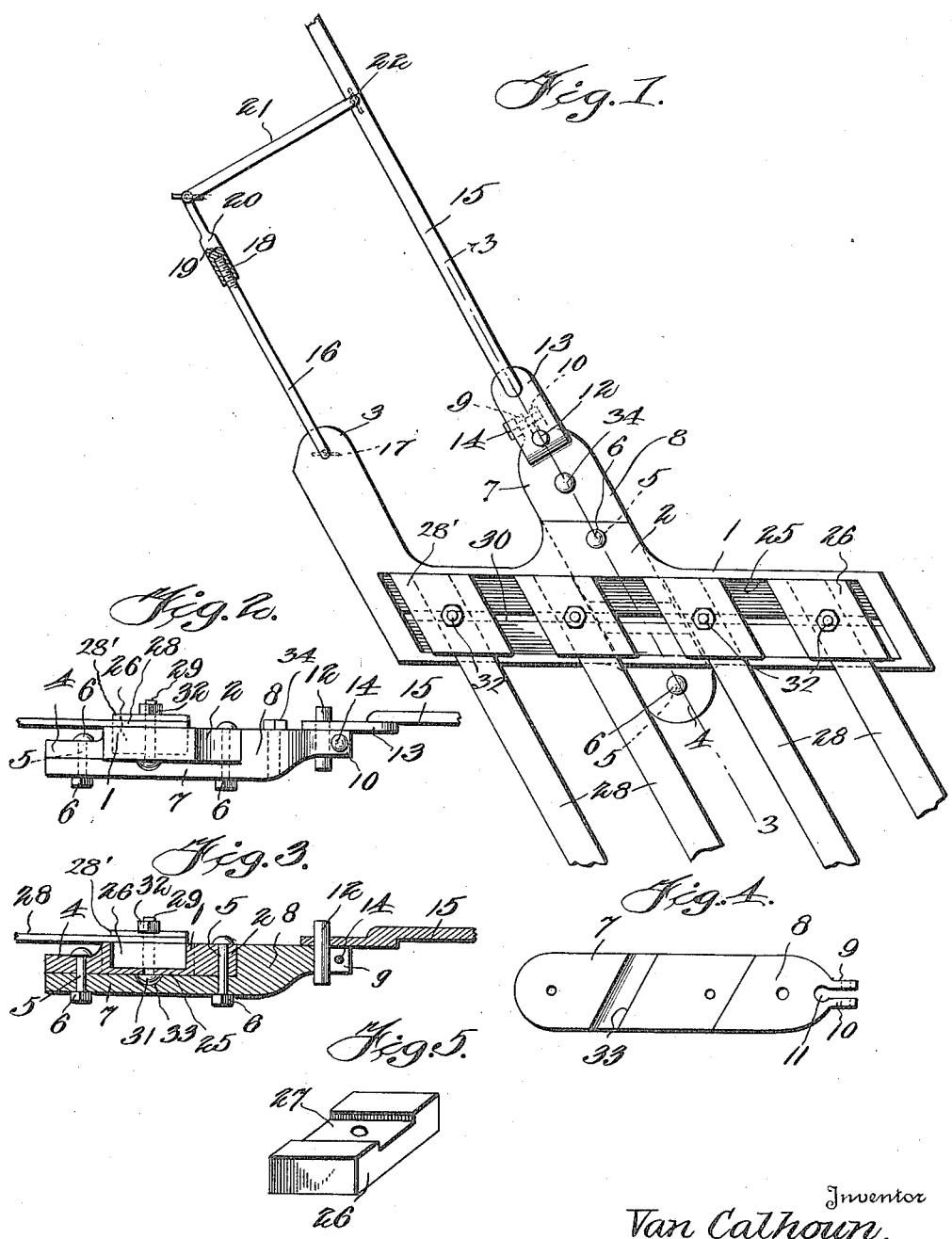

UNITED STATES PATENT OFFICE.

VAN CALHOUN, OF CHANDLER, ARIZONA.

HARROW.

1,148,352.   Specification of Letters Patent.   Patented July 27, 1915.

Application filed March 31, 1915.   Serial No. 18,314.

*To all whom it may concern:*

Be it known that I, VAN CALHOUN, a citizen of the United States, residing at Chandler, in the county of Maricopa and State of Arizona, have invented certain new and useful Improvements in Harrows; and I do hereby declare the following to be a full, clear, and exact description of the invention, such as will enable others skilled in the art to which is appertains to make and use the same.

This invention relates to harrows and more particularly to the type of harrow commonly known as side harrows for use in connection with cultivators or like agricultural implements.

An object of this invention is to provide a side harrow for attachment to a cultivator, for positioning upon the opposite sides of the cultivator, which embodies means for adjusting the position of the harrow for regulating the distribution of the soil or dirt agitated by the harrow teeth, and further to provide means whereby the harrow may be positioned at any desired lateral distance from the cultivator to which it is attached.

Another object of this invention is to provide a side harrow which embodies a supporting plate, having a plurality of harrow carrying teeth adjustably and slidably carried thereby, for permitting of adjustment of the harrow teeth with respect to each other for regulating the scope of the teeth and the distance between the adjacent teeth.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a plan view of the improved harrow, showing part thereof broken away. Fig. 2 is an end view of the harrow. Fig. 3 is a cross sectional view through the harrow on the line 3—3 of Fig. 1. Fig. 4 is a detail plan view of a part of the harrow construction, and Fig. 5 is a detail perspective view of the harrow tooth carrying blocks.

Referring more particularly to the drawings, 1 designates the body plate of the harrow, which has its ends cut at oblique angle to the longitudinal side of the body plate and has forwardly extending lugs 2 and 3 formed upon its forward edge, and a rearwardly extending lug 4 formed upon its rear edge. The lugs 2 and 4 are positioned in alinement with each other, on a line parallel with the oblique ends of the plate 1, and they are provided with openings 5 extending therethrough, through which openings pins 6 are inserted, for securing the attaching plate 7 to the plate 1. The attaching plate 7 is provided with an enlarged or upstanding end 8, the rear end of which abuts the forward end of the lug 2, and it has a pair of spaced tongues 9 and 10 formed upon its forward end. The space between the tongues terminates in a substantially circular opening 11, which is provided for receiving a pin 12, for connecting the harrow to a coupling 13. The ears 9 and 10 are provided with transverse openings through which a bolt 14 extends, for clamping the pin 12 securely in position within the opening 11. The coupling 13 has a connecting rod 15 connected to the forward end thereof, which is connected in any suitable manner to the cultivator structure, (not shown).

A stay rod 16 is connected to the lug 3, and extends outwardly therefrom, parallel to the connecting rod 15. The stay rod 16 has its end angled and loosely mounted within an opening extending vertically through the lug 3 and held in place by a cotter pin indicated at 17. The outer end of the stay rod 16 is externally screw threaded as is shown at 18, and it is adjustably seated in the internally screw threaded enlarged end 19 formed upon the member 20. The member 20 is pivotally connected to an arm 21, which extends across, transversely to the member 20 and the rod 16 and is connected at 22 to the connecting rod 15. By adjusting the connection between the rod 16 and the member 20, the angle of the plate 1, with respect to the rod 15 may be regulated as desired.

The plate 1 is provided with a longitudinally extending facial recess 25, which has a plurality of harrow carrying teeth blocks 26 slidably mounted therein. The harrow teeth carrying blocks 26 are provided with facial recesses 27, in which the ends of harrow teeth 28 are seated. The inner ends of the teeth 28 are held in proper position within the blocks 26, by means of plates 28' which are mounted upon the upper surface of the blocks 26 and bolts 29 which extend through the plates 28', the blocks 26 and through a longitudinally extending slot 30 formed in the bottom of the plate 1. The heads 31 of the bolts 29 engage the under surface of the plate 1 and when the nuts 32 are adjusted upon the bolts for securely clamping the plates 28' upon the upper surface of the blocks 26, the blocks will also be held firmly in adjusted positions within the facial recess 25. The harrow teeth 28 extend rearwardly from the plate 1, parallel to the oblique ends of the plate and they may be curved to form agitating teeth, or they may have the ordinary type of shovel blades mounted thereon, if it is desired, this feature being dependent upon the desires of the person manufacturing or using the harrow. The plate 7 is provided with a groove 33, for receiving the heads 31 of the bolts 29.

By adjusting the angle of connection between the plate 8 and the coupling 13, and regulating the distance of insertion of the screw threaded end 18 of the rod 16 into the member 19, the lateral distance of the plate 1 from the cultivator or other implement to which it is attached may be regulated.

The attaching plate 7 is provided with an opening formed therein, through which the bolt 34 extends. The bolt 34 is provided for attaching a handle to the harrow, if it is so desired.

While in the foregoing description of the drawings, only 1 section of the harrow has been shown which is constructed for attachment upon the right hand side of a cultivator, it is to be understood that a similar section is to be constructed, having its ends angled oppositely to the angled ends of the plate 1, for attachment upon the left hand side of a cultivator or other agricultural implement, without departing from the spirit of this invention.

In reducing the invention to practice certain minor features of construction, combination and arrangement of parts may necessitate alterations to which the patentee is entitled provided such alterations are comprehended within the scope of what is claimed.

What is claimed is:

1. In a harrow, a body plate, a plate connected to the under surface of said body plate and extending forwardly therefrom, a coupling connected to the forward end of said second named plate, a connecting rod connected to said coupling for attaching the body plate to a cultivator, and a plurality of harrow teeth carried by said body plate for lateral adjustment with respect to each other.

2. In a harrow structure, a body plate being provided with a longitudinally extending facial recess, said body plate being provided with a longitudinally extending slot formed centrally between its side edges, a plurality of blocks slidably mounted within said facial recess, harrow teeth removably carried by said block, and bolts extending through said blocks and said longitudinally extending slots, the heads of said bolts engaging the under surface of said body plate for clamping engagement therewith for holding said blocks in various adjusted positions within said facial recess.

3. In a harrow structure, a body plate, a connecting rod connected to said body plate for adjustable pivotal connection therewith, a stay rod connected to said body plate and pivotally connected to said connecting rod, and a plurality of laterally adjustable harrow teeth carrying blocks carried by said body plate.

4. In a harrow structure, a body plate being provided with a longitudinally extending facial recess, a plurality of harrow tooth carrying blocks slidably mounted in said recess for lateral adjustment with respect to each other, a plurality of harrow teeth removably carried by said blocks, means for holding said blocks in various adjusted positions, and means for connecting said body plate to a cultivator, said means being adjustable for varying the lateral distance between the cultivator and said body plate.

5. In a harrow structure, a body plate being provided with a longitudinally extending facial recess, a plurality of harrow tooth carrying blocks slidably mounted within said recess, a plurality of harrow teeth removably carried by said blocks, means for holding said blocks in various adjusted positions within said recess, a pair of lugs connected to and extending forwardly from said body plate, a plate connected to the under surface of said body plate and one of said forwardly extending lugs, and extending forwardly therefrom, a coupling pivotally connected to the forward end of said last named plate, a connecting rod connected to said coupling for attachment to a cultivator, a stay rod pivotally connected to the other of said forwardly extending lugs, means connected to said connecting rod and said stay rod, for adjusting the length of said stay rod in accordance with the adjusted positions of said coupling rod.

In testimony whereof I affix my signature in presence of two witnesses.

VAN CALHOUN.

Witnesses:
H. G. LEMON,
W. G. BARACKMAN.

Copies of this patent may be obtained for five cents each, by addressing the "Commissioner of Patents. Washington, D. C."